Sept. 20, 1955  P. L. W. NOWEE  2,718,236
VALVE FOR A HYDRAULIC BRAKE MECHANISM FOR VEHICLES
Filed May 14, 1951

INVENTOR:
PETRUS LEENDERT WILLEM NOWEE,
BY

HIS AGENT.

United States Patent Office 2,718,236
Patented Sept. 20, 1955

2,718,236

VALVE FOR A HYDRAULIC BRAKE MECHANISM FOR VEHICLES

Petrus Leendert Willem Nowee, Rotterdam, Netherlands

Application May 14, 1951, Serial No. 226,119

Claims priority, application Netherlands May 13, 1950

1 Claim. (Cl. 137—460)

The invention relates to a valve for a brake mechanism for vehicles, comprising a casing, which is with one end connected to a brake cylinder and with the other end to the brake drum of a wheel, in which casing there is a cylindrical bore, in which a spring operated piston can move, whereas means are provided, with which by lack of pressure in the brake conduit the piston can close off said conduit against spring working and can be kept in this position, and means which can keep the piston in the end position, whereby the brake conduit is not closed.

A valve of the above kind is generally known.

With this known construction a long threaded spindle is used, by means of which the piston can be pressed in an end position and be kept in this position.

The use of this very long threaded spindle makes the construction rather expensive, whereas in order to keep the piston in the end position, said spindle must be rotated over a large length, which manipulation takes much time.

The invention has for its object to overcome said drawbacks and to provide a valve of a simple construction, and whereby cheap means makes it possible to keep the piston in the end position.

According to the invention same is obtained by providing a groove near the end of the piston sealing the brake conduit, in which groove a spring operated pawl can reach, which can be operated from the outside and blocks the piston, when same is brought into an end position by the spring, whereby the brake conduit has not been closed off.

When therefore the brake conduit must be filled, the piston is blocked in the free position, so that the bore of the valve remains in open connection with the brake conduit.

An appropriate construction according to the invention is that, whereby in the piston near the end closing off the brake conduit a narrow groove and near the other end a wide groove have been made, in such a way, that when the pawl rests with the broad end on a piston, this part can only cooperate with the wide groove and when the pawl rests with the small part on the piston, same can be kept by the pawl in the open end position, whereby the brake conduit has not been closed off.

The invention is illustrated in the accompanying drawings and more precisely described underneath.

Figure 1:
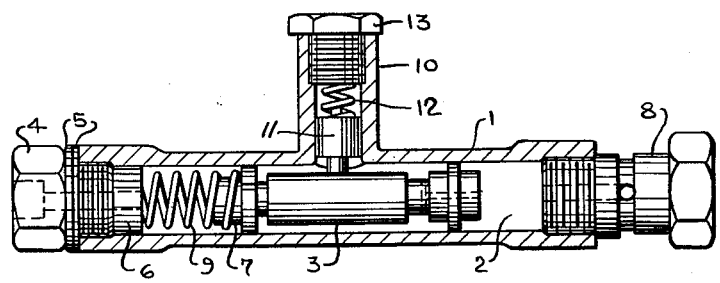
Fig. 1 is a longitudinal sectional view of the valve according to the invention.

In the drawing 1 indicates the casing of the valve with a cylindrical bore 2. The piston 3 can freely move in this cylindrical bore. A nipple 4 for fluid outlet is connected to the casing, which nipple has a bore, and the brake conduit is connected to said nipple. Between the nipple and the wall 1 of the casing end rings or packing rings 5 are provided. A resilient sealing member is indicated at 6, which member forms a valve seat and can cooperate with the part 7 of the piston 3, so that the brake conduit can be closed off, when the piston is moved towards the nipple 4 against the working of the spring 9. Another nipple 8 for the fluid inlet is connected to the wall 1 of the casing, which nipple is connected to the master cylinder.

In the wall of the casing a branch pipe 10 is provided, in which a latch or pawl 11 can freely move, which pawl is pressed in the direction of the piston 3 by a spring 12. The branch pipe 10 can be closed by means of a bolt 13, so that the pawl 11 with the spring 12 has been sealed in the branch pipe. When the whole is filled with a medium, for instance oil or other brake fluid, the column medium and also the piston 3 will move when a pressure is exerted on the medium by the master cylinder 8.

When the brake conduit is completely intact, the vehicle can be braked with the brake pedal of the vehicle in the usual way, whereby a column medium with the piston is moved to the left in Fig. 1. When the brake pressure is relaxed, the column medium with the piston 3 will move to the right. The movement of the piston will thereby be supported by the spring 9.

Figure 3:
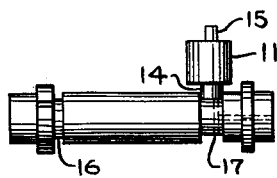
Fig. 3 is an elevational view similar to Fig. 2, but showing the piston in the other end position.

If owing to rupture of the brake conduit or in another way the pressure at the left side of the piston disappears fully, the piston 3 will move completely to the left against the action of the spring 9, whereby the part 7 of the piston is pressed against the sealing member 6 and at the same time the pawl 11 with the projection 14 will come into the groove 17 of the piston 3, so that the piston will be blocked in this position (see Fig. 3).

When the defect has been remedied, the brake conduit must again be filled and freed from air. For this purpose the pawl 11 is lifted and the piston 3 will move to the right owing to the pressure of the spring 9 and will thereby unblock the bore in the nipple 4.

According to the invention the piston can be held in this free or open position by a second projection 15 which is formed in the same manner on the pawl 11 as the projection 14.

However it is advisable to make the projection 14 broad and to make the second projection 15 small. One end of the piston has been provided with a narrow groove 16 and the other end with a wide groove 17.

Under normal circumstances of brake use the broad projection 14 of the pawl is situated in the bore of the valve casing, which broad part cannot cooperate with the groove 16, but will with the groove 17 in case of pressure failure as mentioned in the foregoing.

Figure 2:
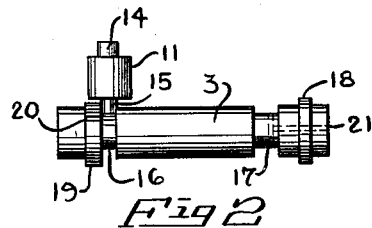
Fig. 2 is an elevational view showing the piston with the cooperating pawl in the end position.

When the pawl is in this position, namely in which the broad projection 14 is positioned downwardly and the opposite projection 15 upwardly, the piston can only be blocked in the closed position (see Fig. 3). When the brake conduit must be filled, the pawl 11 is turned and brought in the position as illustrated in Fig. 2, therefore a position, whereby the small projection 15 can rest on the piston 3.

The piston is brought in the righthand or open position by the spring 9 following repair, whereby the groove 16 can cooperate with the part 15, so that the piston is arrested in this open or free position. Therefore the bore in the nipple 4 remains open and the brake conduit can be filled from the brake cylinder and be freed from air.

Therewith the medium can be pressed past the packing cup 18 of the piston 3, but it is advisable to provide a bore 21 in the piston, which opens into the groove 17.

Figure 4:
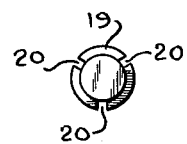
Fig. 4 is an end elevational view of a detail of the piston.

Some grooves 20 have been provided in the collar 19 (see Fig. 4), so that the medium can enter into the brake conduit with less resistance.

When the defective brake conduit has been replaced or the defect has been remedied, the brake conduit must be filled again with oil. The broad end 14 must be brought in a position that it cannot cooperate with the groove 17, which can be done for instance by hand; this means that pawl 11 can be lifted with a tool, such as pointed pincers. When the brake pedal is pressed down, the oil will come into the cylinder, with the result that piston 3 will move again to the left and so the broad end 14 will come once more into the groove 17. In order to prevent this the pawl 11 is turned around; this means the pawl with the broad end 14, supported by the piston 3 is brought into the branch pipe 10. Because the piston 3 has been moved to the right by spring 9 so far that the groove 16 is brought under the branch pipe 10, pawl 11 will come in a position as indicated in Fig. 2, this means that piston 3 can be locked in the right hand position whereby the brake conduit remains in communication with the master cylinder. The oil of the brake cylinder can flow through the bore 21 and along the piston 3 and can enter into the branch pipe 10, but same is closed by means of a hollow bolt 13, with the help of, for instance, a rubber packing; the oil will thus ultimately flow into the brake conduit through groove 20 of the collar 19. The air in the brake conduit can escape when the hollow bolt 13 is loosened. When the brake conduit is completely filled with oil, the air will be removed from same and a little quantity of oil will flow out of the branch pipe 10, and thus it can be noted from the outside that the brake conduit is completely filled. Now the hollow bolt 13 is turned completely out of the branch pipe 10 and the pawl 11 is to be turned around as described above so that the broad end 14 is supported by piston 3.

A further advantage of the bore 21 is, that loss of medium caused by leakage can immediately be replaced.

It is also possible to apply a separate pawl with a small end 15 and to bring same in the bore 2, when the brake conduit must be filled, but a drawback of same is that such a small member will easily get lost. According to the invention this drawback is eliminated, as the pawl 11 is always in the branch pipe 10.

I claim:

In a valve for a hydraulic brake mechanism, in combination, an elongated valve housing defining a bore, a nipple for fluid outlet disposed near one end of said housing, a valve seat formed on said nipple, a second nipple for fluid inlet disposed near the opposite end of said housing, said outlet and inlet nipples intercommunicating with said bore, a piston disposed in said bore and being oppositely movable longitudinally therein between a valve closing position near said outlet nipple and an opposite positon spaced therefrom, a spring operable to urge said piston away from said valve closing position for opening the valve, said piston including near one end facing said outlet nipple a portion operable to abut against said valve seat to close the valve when said piston is moved to the valve closing position, a narrow annular groove formed in the external surface of said piston near said one end thereof facing said outlet nipple, a wide annular groove formed in the external surface of the piston near the opposite end thereof, and a spring pressed movable latch having a narrow projection and a wide projection oppositely disposed relative to said narrow projection on said latch, said wide projection being dimensioned to be received by said wide groove and sufficiently large to be rejected by said narrow groove, said narrow projection being dimensioned to be received by said narrow groove, said latch being turnable for selectively directing one projection towards the surface of said piston for engagement with a groove.

References Cited in the file of this patent

UNITED STATES PATENTS

| | | |
|---|---|---|
| 1,922,252 | Martini | Aug. 13, 1933 |
| 2,093,015 | Madden | Sept. 14, 1937 |
| 2,127,849 | Stone | Aug. 23, 1938 |
| 2,216,570 | Hollingshead | Oct. 1, 1940 |
| 2,253,580 | Rahe | Aug. 26, 1941 |